Oct. 12, 1965  H. KRABBENSCHMIDT  3,211,311
PALLET FOR BULK LOADS
Filed Aug. 29, 1962

Henry Krabbenschmidt
INVENTOR.

BY Ramsey, Kolisch + Hartwell
ATTYS

United States Patent Office 3,211,311
Patented Oct. 12, 1965

3,211,311
PALLET FOR BULK LOADS
Henry Krabbenschmidt, Hillsborough, Calif., assignor to Isbrandtsen Company, Inc., New York, N.Y., a corporation of New York
Filed Aug. 29, 1962, Ser. No. 220,230
5 Claims. (Cl. 214—300)

This invention is for a pallet, and more particularly a pallet for supporting a relatively large load of bulk material.

Bulk material, including such particulate material as rice and various grains, is frequently packaged for storage and transportation in huge, soft-walled containers, known as bin sacks or bags, that may weigh up to several thousand pounds when full. The transportation of such bags, and particularly the discharging of their contents, poses many problems in cargo handling. Because of their size and weight (when filled), and the pliable material from which the bags are made, they do not lend themselves to existing cargo-handling facilities.

An object of the invention is to provide an improved, simple device for transporting loaded containers, that facilitates discharging the contents of the containers into a bin or other receptacle.

According to the invention, a pallet is provided, on which a bag is set up and then filled. The pallet and bag may then be moved easily, by conventional lifting mechanism, such as a fork lift truck or other type of hoist. When it is desired to unload the contents of a bag, the construction of the pallet permits cutting a hole in what forms a floor over the bottom of the bag, whereby the material therein may flow freely out the bottom. Thus, the necessity of lifting, tipping, or otherwise moving the bag itself with respect to the supporting pallet is avoided.

A pallet constructed according to the invention briefly comprises a platform with an upper, normally flat supporting surface, having at least one large aperture provided therein through which the contents of a bag on the pallet may be discharged, when desired. A bead forming an upstanding barrier about the pallet is contemplated, for confining a bag in proper position on the pallet. There is also provided adjacent at least one edge portion and the bottom of the pallet, roller means enabling the pallet to be rolled over a surface. The pallet may further include line-attaching means, to permit lifting of the pallet with a line such as a cable. In one embodiment of the invention, the pallet may be lifted through line-attaching means disposed peripherally about the pallet, and in another embodiment the line-attaching means contemplated is located centrally on the pallet.

The invention will now be described in greater detail, with reference to the accompanying drawings, wherein.

Figure 2:
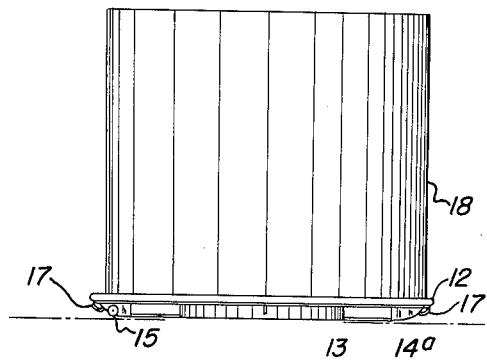
FIG. 2 is a side elevation of the pallet in FIG. 1, with a bag mounted on the pallet.

Referring to the drawings, and first of all FIGS. 1–4, the pallet comprises a substantially horizontal platform 10 (illustrated in FIG. 4 as a double thickness of plate) with an upper surface that is substantially flat. In a central portion of the platform, a plurality of discharge apertures or holes 11 are provided that extend through the platform. Platform 10 preferably has a circular outline, and is made from a strong, rigid material, such as steel, wood or the like.

A raised edge or bead 12 may be provided about the perimeter of the platform and functions to retain the bottom of a bag or other container in proper position on the pallet. The bead forms an upstanding barrier about the platform. In some uses of the pallet it may not be necessary to have a surrounding bead because of the type of material in the bag or the construction of the bag itself.

Figure 1:
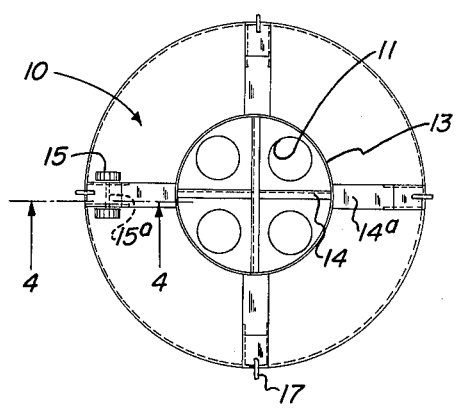
FIG. 1 is a bottom, plan view of the pallet according to one embodiment of the invention.

On the bottom side of platform 10 there is a depending hollow tube or thimble 13. The tube surrounds the area in the platform having holes 11 therein. The tube is open at its base, and thus the holes are exposed on the bottom of the pallet. The tube is fastened to the underside of the platform, in any suitable manner, as by welding in the case of steel construction. Angle irons 14 extending across each other on the inside of the tube constitute stiffening members bracing the inside of the tube. Box-like supporting members 14a fastened to the platform extend radially out from the outside of the tube and strengthen the margins of the platform. As seen in FIG. 1, a pair of box-like supporting members 14a are aligned in one direction extending diametrically across platform 10, and the angle irons 14 aligned with and between these members, constitute one of a pair of diametrically extending strengtheners on the underside of the platform. The other pair of aligned box-like members 14a, and the angle irons aligned with and between these members, constitute the other strengthener. The two strengtheners are at right angles to each other.

Figure 4:
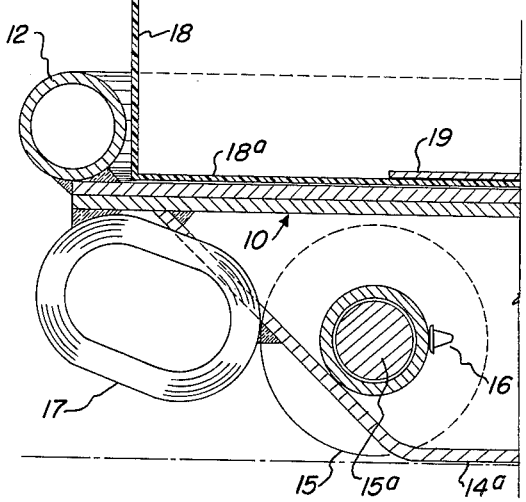
FIG. 4 is a section view, taken along the lines 4—4 in FIG. 1, and drawn on a somewhat larger scale.

A feature of the invention is that the pallet may be transported by lifting one end or edge and moving the opposite end or edge of the pallet along the ground. In order to achieve this movement, suitable roller or ground-engaging means are employed. They may conveniently be in the form of a pair of wheels 15 provided adjacent an edge portion of the pallet. The wheels are mounted on an axle 15a journaled on a supporting member 14a near its outer end. The axle is lubricated through a grease fitting 16. As can be seen in FIG. 4, the wheels are out of contact with the ground when the pallet is flat on the ground. Under certain conditions it may be possible to slide the ground-engaging portions of the pallet along the ground.

In the embodiment of the invention illustrated in FIGS. 1–4, a lifting eye 17 is welded to the outer end of each of the box-like supporting members 14a. These function as a line-attaching means, and are provided to enable lifting cables and the like to be fastened onto the pallet. When lifting eyes are used a pallet can be lifted entirely free of the ground, with the platform thereof maintained horizontal.

Figure 3:
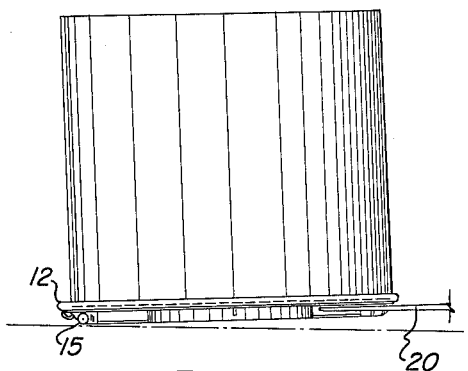
FIG. 3 is a side elevation of the pallet and bag shown in FIG. 2, and showing one side of the pallet lifted preparatory to rolling the pallet over a floor with a fork lift truck.

As shown in FIGS. 2, 3 and 4, when using the pallet, a large bag 18 capable of holding bulk material such as grain and the like is placed on the pallet within the area bounded by bead 12. Bag 18 ordinarily does not have a closed bottom, and base 18a of the bag is open over an area that extends over apertures or holes 11. A filler sheet 19 is used in conjunction with the bag, which extends over and closes off the open portion in the base of the bag. The construction of the bag may be of any suitable material, such as multiwall fiberglass, impregnated paper, nylon-supported polyethylene, canvas, and the like. The filler 19 is usually made of material such as cardboard that can be easily punctured and cut open.

The invention is used as follows: A bag 18 with a sheet 19 closing off the bottom thereof is first placed on platform 10. Material, such as rice or grain, is then poured directly through the top into the bag, from an overhead spout or other delivery means, until the bag is filled. Subsequently the top of the bag may be closed off to leave a bag fully loaded with grain seated firmly under its own weight on the pallet.

The filled bag and pallet may be readily transported by lifting an edge portion of the pallet opposite the location of wheels 15, and pushing the pallet with the wheels under the pallet now providing rolling support therefor. An edge of the pallet may be lifted, using the forks of a fork-lift truck, exemplified by the forks generally shown at 20 in FIG. 3. The pallet may also be moved by providing a lift truck with forks long enough to extend under a substanital portion of platform 10, and placing such forks under the platform and then raising the forks, with the entire pallet moving clear of the ground.

If it is desired to raise the pallet and bag, and deposit them in a location such as the hold of a ship, hoisting cables are attached to lifting eyes 17 and the pallet platform may be maintained substantially horizontal as it is moved.

Figure 5:
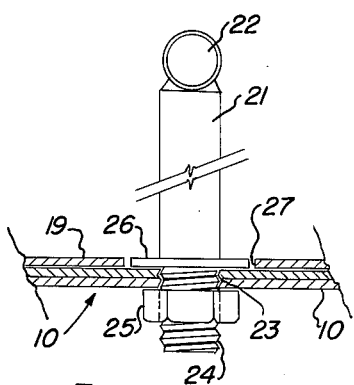
FIG. 5 is a fragmentary, cross-sectional view through the center of a pallet according to a modification of the invention, with such modification including a centrally located line-attaching means.

In the embodiment of the invention shown in FIGS. 1–4, the lifting eyes are circumferentially equally spaced around the periphery of the pallet. In FIG. 5, a modification of the invention is illustrated, where a lifting eye is provided positioned over a center portion of the pallet.

Referring to FIG. 5, a lifting post 21 is shown having secured to the top thereof an eye 22. Platform 10 of the pallet is provided with a threaded bore 23 which receives a threaded end portion 24 of post 21. A nut 25 screwed onto end 24 firmly fastens the post in place and flange 26, integral with the post, fits snugly against the top of the platform.

With the modification of the invention illustrated in FIG. 5, lifting post 21 is employed having a length exceeding the height of bag 18. The bottom of the bag or filler sheet 19 is provided with a central hole 27 to accommodate post 21. With the bag and filler sheet properly positioned on the platform of the pallet, and the bag filled with grain, the pallet, together with the bag and its contents, may be lifted entirely clear of the ground by attaching a lifting cable to eye 22 and raising the cable. One or more discharge apertures, similar to holes 11 shown in FIG. 1, are provided in platform 10. Ground-engaging means, similar to wheels 15, may also be mounted on one edge of the pallet shown in FIG. 5.

To dump the contents of a bag, the pallet and bag are moved to a position over a chute, bin, or other receiving receptacle, in the manner just described. A knife or other cutting tool is then inserted into filler sheet 19 from the bottom of the pallet upwardly through holes 11 in the platform. If the filler sheet is cut, passages are provided for the flow of material out from the bottom of the bag. During the dumping of the bag's contents, tube 13 functions to funnel the material flowing out from the base of the pallet.

The size and positioning of holes or apertures 11 in the base of the pallet is subject to some variation. In general terms, the holes should be large enough to permit the material being handled to flow freely from the base of the bag when the filler sheet is cut open. The holes, however, should not be so large as to prevent the platform of the pallet from rendering proper support for a loaded bag.

The invention in its broadest aspects contemplates a pallet having a hole through its supporting platform, which is covered by a sheet of material which may be punctured or otherwise opened to permit discharge of material on the pallet through the hole.

The invention thus contemplates a pallet which will permit ready loading, transportation, and unloading of large bags of bulk material. After a bag has been emptied, it may be reused, simply by providing a new filler sheet as a bottom for the bag on a pallet.

Modifications and variations of the invention will suggest themselves to those skilled in the art. It is intended to cover all such modifications and variations that come within the scope of the appended claims.

I claim:

1. A pallet for supporting a bag containing bulk material comprising a circular platform having a substantially flat upper side for supporting the bag, an upstanding bead extending around the perimeter of said platform for confining the margins of the bag, passage means in a central portion of said platform through which the material may be dumped, plural supports on the bottom side of said platform spaced at substantially 90 degree angles around the perimeter thereof for supporting the platform above the ground, wheel means mounted adjacent an edge portion of said pallet on one of said supports and lifting eyes mounted on said supports substantially equally circumferentially spaced about the perimeter of said platform.

2. The combination of a container with a base, an aperture in the base of said container, a substantially flat platform supporting the base of the container, means supporting the platform above the ground, an aperture extending through the platform and positioned inwardly from the perimeter of the platform, said aperture in the platform being below the aperture in the base of the container, and a bottom sheet for the container extending over the aperture in the base of said container and the aperture in the platform, said bottom sheet bing punctured through the apertures in said platform and container base whereby the contents of the container can be emptied through the platform.

3. The combination of claim 2, where the aperture in said platform is circular, and the aperture in said base of the container is open over an area that extends over the aperture in said platform.

4. A pallet comprising, in operative position,
 a substantially horizontal platform for supporting a container,
 an elongated strengthener joined to the platform extending across the underside of the platform and substantially through the middle of the platform, having opposite end portions adjacent opposite margins of the platform that freely support the platform above the ground,
 the underside of said platform and one of said end portions adjacent one of said opposite platform margins defining a pair of passages disposed on either side of said one end portion that accommodate the insertion of laterally spaced lifting forks under the platform,
 and roller means journaled on the other of said end portions adjacent the other of said opposite platform margins, with the rotation axis thereof extending transversely of said elongated strengthener.

5. The pallet of claim 4 where said strengthener includes a central portion between said end portion extending across the middle of the platform, and which further includes a pair of apertures in said platform located on either side of said central portion of said strengthener.

(References on following page)

References Cited by the Examiner

UNITED STATES PATENTS

| | | | |
|---|---|---|---|
| 203,924 | 5/78 | Ladd | 141—330 |
| 1,052,222 | 2/13 | Denney | 108—51 X |
| 1,498,646 | 6/24 | Dahl et al. | 280—47.13 |
| 1,510,564 | 10/24 | Stockfleth et al. | 294—1 |
| 1,657,782 | 1/28 | Berg | 222—80 X |
| 1,814,252 | 7/31 | Leary | 108—55 X |
| 2,107,995 | 2/38 | Statham et al. | 214—305 X |
| 2,206,121 | 7/40 | Pierce | 214—95 |
| 2,831,591 | 4/58 | Morton | 214—305 |
| 2,946,601 | 7/60 | Branning et al. | 214—370 X |
| 3,021,044 | 2/62 | Schubert. | |

FOREIGN PATENTS 1,113,420  8/61  Germany.

HUGO O. SCHULZ, *Primary Examiner.*

GERALD M. FORLENZA, *Examiner.*